US006144950A

United States Patent [19]

[11] Patent Number: 6,144,950

[45] Date of Patent: Nov. 7, 2000

Davies et al.

[54] POSTAGE PRINTING SYSTEM INCLUDING PREVENTION OF TAMPERING WITH PRINT DATA SENT FROM A POSTAGE METER TO A PRINTER

[75] Inventors: Brad L. Davies, Trumbull; Sungwon Moh, Wilton; Mark A. Scribe, Southbury, all of Conn.

[73] Assignee: Pitney Bowes Inc., Stamford, Conn.

[21] Appl. No.: 09/032,804

[22] Filed: Feb. 27, 1998

[51] Int. Cl.[7] .......... G06F 17/00

[52] U.S. Cl. .......... 705/401; 705/60

[58] Field of Search .......... 705/1, 401, 60; 714/1, 48, 49

[56] References Cited

U.S. PATENT DOCUMENTS

| | | | |
|---|---|---|---|
| 4,253,158 | 2/1981 | McFiggans | 705/60 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,775,246 | 10/1988 | Edelmann et al. | 705/62 |
| 4,813,912 | 3/1989 | Chickness et al. | 705/408 |
| 4,831,555 | 5/1989 | Sansone et al. | 358/1.14 |
| 4,853,865 | 8/1989 | Sansone et al. | 705/403 |
| 4,853,961 | 8/1989 | Pastor | 713/176 |
| 4,935,961 | 6/1990 | Gargiulo et al. | 380/260 |
| 4,949,381 | 8/1990 | Pastor | 380/51 |
| 5,142,577 | 8/1992 | Pastor | 705/62 |
| 5,181,245 | 1/1993 | Jones et al. | 705/61 |
| 5,293,465 | 3/1994 | Abumehdi et al. | 358/1.14 |
| 5,583,779 | 12/1996 | Naclerio et al. | 705/408 |
| 5,583,940 | 12/1996 | Vidrascu et al. | 380/49 |
| 5,606,613 | 2/1997 | Lee et al. | 380/21 |
| 5,666,421 | 9/1997 | Pastor et al. | 380/51 |
| 5,680,456 | 10/1997 | Baker et al. | 705/71 |
| 5,684,949 | 11/1997 | Naclerio | 713/200 |
| 5,687,237 | 11/1997 | Naclerio | 380/29 |
| 5,715,164 | 2/1998 | Liechti et al. | 364/464.2 |
| 5,781,438 | 7/1998 | Lee et al. | 705/404 |
| 5,799,290 | 8/1998 | Dolan et al. | 705/410 |
| 5,898,785 | 4/1999 | Cornell et al. | 380/51 |
| 6,050,486 | 4/2000 | French et al. | 235/101 |

FOREIGN PATENT DOCUMENTS 2 197 262 5/1988 United Kingdom .

OTHER PUBLICATIONS

Pavely, Richard; Intelligent Indicias; Nov 1996; Office Systems v13n11 pp.18–19 (DialogWeb reference pp. 1–3).
Applied Cryptography, Author Bruce Schneier.

*Primary Examiner*—Edward R. Cosimano
*Assistant Examiner*—Thomas A. Dixon
*Attorney, Agent, or Firm*—Angelo N. Chaclas; Michael E. Melton

[57] ABSTRACT

A postage printing system includes a printer and a postage meter. The postage meter includes a controller for generating print information having a plurality of print data blocks necessary to print a postal indicia. The printer is located remotely from the postage meter and includes a controller and a printer for printing the postal indicia. The printer controller is in operative communication with the postage meter controller for receiving the plurality of print data blocks. The postage meter controller encrypts the plurality of print data blocks into a plurality of encrypted print data blocks, respectively, using a cypher block chaining encryption algorithm prior to transmitting the plurality of encrypted print data blocks to the printer controller where they are decrypted by the printer controller. Check numbers for each print data block and validation of the check numbers may be employed at the printer controller. Also, the printer controller may compare the validation rates of print data blocks containing significant data and those containing insignificant data for evidence of tampering.

14 Claims, 3 Drawing Sheets

POSTAGE PRINTING SYSTEM INCLUDING PREVENTION OF TAMPERING WITH PRINT DATA SENT FROM A POSTAGE METER TO A PRINTER

CROSS REFERENCE TO RELATED APPLICATIONS

This application is related to concurrently filed copending U.S. patent application Ser. No. 09/032,391 entitled POSTAGE PRINTING SYSTEM HAVING SECURE REPORTING OF PRINTER ERRORS.

FIELD OF THE INVENTION

This invention relates to value dispensing systems. More particularly, this invention is directed to preventing tampering with a postage printing system including a postage meter for securely storing postal accounting information and a remotely located printer.

BACKGROUND OF THE INVENTION

One example of a value printing system is a postage printing system including an electronic postage meter and a printer for printing a postal indicia on an envelope or other mailpiece. Recent efforts have concentrated on removing the printer from being an integral part of the postage meter. Electronic postage meters for dispensing postage and accounting for the amount of postage used are well known in the art. The postage printing system supplies proof of the postage dispensed by printing a postal indicia which indicates the value of the postage on an envelope or the like. The typical postage meter stores accounting information concerning its usage in a variety of registers. An ascending register tracks the total amount of postage dispensed by the meter over its lifetime. That is, the ascending register is incremented by the amount of postage dispensed after each transaction. A descending register tracks the amount of postage available for use. Thus, the descending register is decremented by the amount of postage dispensed after each transaction. When the descending register has been decremented to some value insufficient for dispensing postage, then the postage meter inhibits further printing of indicia until the descending register is resupplied with funds.

Generally, the postage meter communicates data necessary for printing a postal indicia to the printer over suitable communication lines, such as: a bus, data link, or the like. During this transfer, the data may be susceptible to interception, capture and analysis. If this occurs, then the data may be retransmitted at a later time back to the printer in an attempt to fool the printer into believing that it is communicating with a valid postage meter. If successful, the result would be a fraudulent postage indicia printed on a mailpiece without the postage meter accounting for the value of the postage indicia.

It is known to employ secret cryptographic keys in postage printing systems to prevent such fraudulent practices. This is accomplished by having the postage meter and the printer authenticate each other prior to any transfer of print data or printing taking place. One such system is described in U.S. Pat. No. 5,794,290 entitled METHOD AND APPARATUS FOR SECURELY AUTHORIZING PERFORMANCE OF A FUNCTION IN A DISTRIBUTED SYSTEM SUCH AS A POSTAGE METER (E-476), now issued as U.S. Pat. No. 5,799,290. Another such system is described in U.S. patent application Ser. Co./No. 08/864,929, filed on May 29, 1997, and entitled SYNCHRONIZATION OF CRYPTOGRAPHIC KEYS BETWEEN TWO MODULES OF A DISTRIBUTED SYSTEM. These types of mutual authentication systems help to ensure that the printer is being contacted by a valid postage meter and that the postage meter is in communication with a valid printer.

Once the postage meter and the printer have mutually authenticated each other, the exchange of print data may begin. A portion of the print data requires generation of a secure token in the postage meter. This token is printed within the postal indicia and is used by a postal authority to verify the integrity of the postal indicia. Generally, the token is an encrypted representation of the postal information contained within the postal indicia printed on the mailpiece. In this manner, the postal authority can read the postal information printed on the mailpiece and independently calculate a token for comparison purposes with the token printed on the mailpiece. In the alternative, the token on the mailpiece may be decrypted to derive the postal information that is anticipated to be printed on the mailpiece. Examples of such techniques are described in U.S. Pat. Nos. 4,831,555 and 4,757,537.

Although mutual authentication and token verification contribute significantly to the security of the postage printing system, potential attack points still exist. For example, the print data may be susceptible to interrogation and tampering as it travels from the postage meter to the printer. Thus, a successful attacker would be able to manipulate the print data to produce an altered postal indicia that would pass verification by the postal authority. In this way, the successful attacker could print a postal indicia in excess of the postal value that was authorized and accounted for by the postage meter. To combat this potential attack, it is known from U.S. Pat. No. 5,583,779 to encrypt the print data itself at the postage meter before transmission and subsequently decrypt the print data at the printer.

Although this approach generally works well by adding another level of security, it may not be sufficient to defeat a sophisticated attacker. Several factors exist that assist the sophisticated attacker, such as: (i) the potential attacker has access to the encrypted print data as described above; (ii) the potential attacker has access to the decrypted print data as evidenced by the postal indicia printed on the mailpiece; (iii) the potential attacker has access to an unlimited number of print data streams and associated postal indicias; (iv) the print data does not vary much from postal indicia to postal indicia due to the high degree of fixed data (design graphics, meter serial number, zip code, etc.) and predictable variable data (date, postage amount); and (v) the potential attacker has control over the some of the predictable variable data (postage amount). Thus, the potential attacker has a great deal of knowledge concerning the encrypted print data due to the inherent nature of the postage printing system. Using this readily available knowledge and knowing the regular structure (geographic layout) of the postal indicia, the degree of difficulting in defeating the encryption of the print data is reduced.

This problem is particularly accute if traditional electronic code book (ECB) encryption is used. In ECB encryption the same input data will always encrypt to the same output data so long as the encryption key remains the same. Thus, the attacker may begin to compile a code book revealing the correspondence between the input data and the output data without having to break the encryption algorithm or the encryption key.

Therefore, there is a need for a postage printing system including a postage meter and a printer in communication with but physically separate from the printer that provides for increased security of the print data that is transmitted from the postage meter to the printer.

SUMMARY OF THE INVENTION

Accordingly, it is an object of the present invention to provide a postage printing system with improved security and interchangeability which substantially overcomes the problems associated with the prior art.

In accomplishing this and other objects there is provided a postage printing system including a printer and a postage meter. The postage meter includes a controller for generating print information having a plurality of print data blocks necessary to print a postal indicia. The printer is located remotely from the postage meter and includes a controller and a printer for printing the postal indicia. The printer controller is in operative communication with the postage meter controller for receiving the plurality of print data blocks. The postage meter controller encrypts the plurality of print data blocks into a plurality of encrypted print data blocks, respectively, using a cypher block chaining encryption algorithm prior to transmitting the plurality of encrypted print data blocks to the printer controller where they are decrypted by the printer controller.

Additionally, the postage printing system may employ check sums. The postage meter control means may calculate a plurality of check sum numbers for each of the plurality of print data blocks, respectively, for transmission to the printer controller. Then, the printer control means may also calculate a plurality of check sum numbers for each of the plurality of print data blocks, respectively, to determine if a check sum number received from the postage meter matches a corresponding check sum number calculated by the printer controller so as to validate the integrity of transmission.

Further, the postage printing system may characterize the plurality of print data blocks as either of significant data content or insignificant data content. Then, the printer controller may: (i) determine a significant data check sum validation failure rate for the plurality of print data blocks of significant data content, (ii) determine an insignificant data check sum validation failure rate for the plurality of print data blocks of insignificant data content, and (iii) compare the significant data check sum validation failure rate to the insignificant data check sum validation failure rate for evidence of tampering.

In accomplishing this and other objects there is provided a method of operating a postage printing system that is generally analogous to summary provided above.

Therefore, it should now be apparent that the invention substantially achieves all the above objects and advantages. Additional objects and advantages of the invention will be set forth in the description which follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
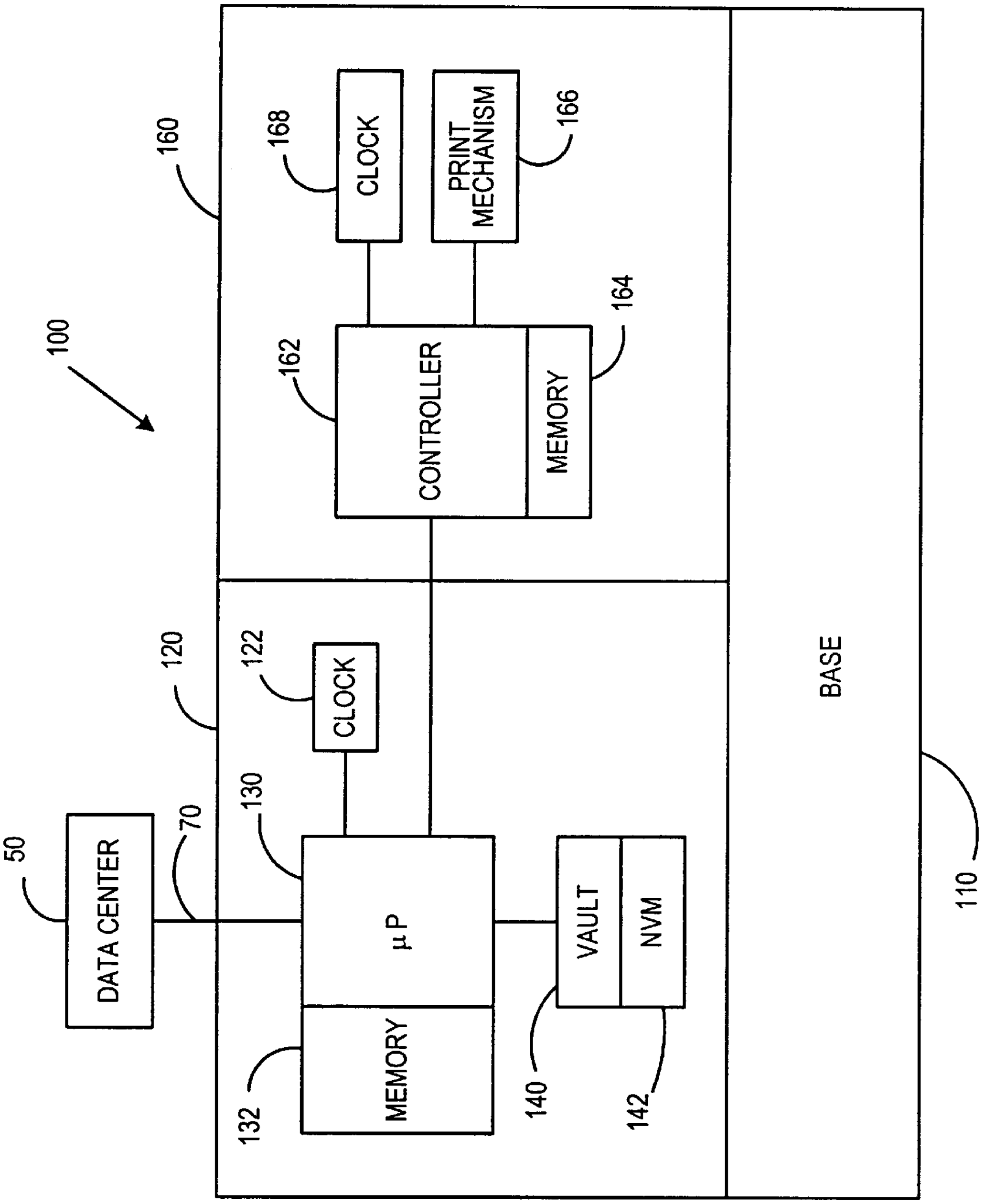
FIG. 1 is a schematic representation of a postage printing system including a postage meter and a printer in accordance with the present invention.

Referring to FIG. 1, a postage printing system 100 in accordance with the present invention is shown. The postage evidencing system 100 includes a mailing machine base 110, a postage meter 120 and a printer 160.

The mailing machine base 110 includes a variety of different modules (not shown) where each module performs a different task on a mailpiece (not shown), such as: singulating (separating the mailpieces one at a time from a stack of mailpieces), weighing, moistening/sealing (wetting and closing the glued flap of an envelope) and transporting the mailpiece through the various modules. However, the exact configuration of each mailing machine is particular to the needs of the user. Since a detailed description of the mailing machine base 110 is not necessary for an understanding of the present invention, its description will be limited for the sake of clarity.

The postage meter 120 (which may be a smart card, a housing containing an accounting circuit board, or the like) is detachably mounted to the mailing machine base 110 by any conventional structure (not shown) and includes a microprocessor 130 having a memory 132, a clock 122 and a vault or accounting unit 140 having a non-volatile memory (NVM) 142. The clock 122 is in communication with the microprocessor 130 for providing real time clock data. The vault 140 holds various accounting and postal information (not shown), such as: an ascending register, a descending register, a control sum register, a piece count register and a postal identification serial number in the NVM 142. The vault 140 is also in communication with the microprocessor 130 for receiving appropriate read and write commands from the microprocessor 130. The microprocessor 130 is in operative communication with the mailing machine base 110 over suitable communication lines (not shown). Additionally, the microprocessor 130 of the postage meter 120 is in operative communication with a remote data center 50 over suitable communication lines, such as a telephone line 70. The data center 50 communicates with the postage meter 120 for the purposes of remote inspection, downloading of postal funds to the vault 140 and other such purposes.

The printer 160 is also detachably mounted to the mailing machine base 110 by any conventional structure (not shown) and includes a controller 162 having a memory 164, a print mechanism 166 and a clock 168. The controller 162 is in operative communication with the microprocessor 130 of the postage meter 120 and the print mechanism 166 over suitable communication lines. The memory 164 has stored therein an identification serial number that is unique to the printer 160. The clock 168 is in communication with the controller 162 for providing real time clock data. The print mechanism 166 prints a postal indicia (not shown) on a mailpiece (not shown) in response to instructions from the postage meter 120 which accounts for the value of the postage dispensed in conventional fashion. The print mechanism 166 may be of any suitable design employing dot matrix or digital printing technology, such as: thermal transfer, thermal direct, ink jet, wire impact, electrophotographic or the like.

To provide for security of postal funds and to prevent fraud, the postage meter 120 and the printer 160 are provided with secret cryptographic keys which are necessary for mutual authentication to ensure that: (i) the postage meter 120 will only transmit postal indicia print information to a valid printer 160; and (ii) the printer 160 will only execute postal indicia print information received from a valid postage meter 120. Generally, a mutual authentication routine involves the encryption and decryption of secret messages transmitted between the postage meter 120 and the printer 160. An example of such a routine can be found in U.S. patent application Ser. Co./No. 08/864,929, filed on May 29, 1997, and entitled SYNCHRONIZATION OF CRYPTOGRAPHIC KEYS BETWEEN TWO MODULES OF A DISTRIBUTED SYSTEM, incorporated herein by reference. However, since the exact routine for mutual authentication is not necessary for an understanding of the present invention, no further description is necessary. Once mutual authentication is successful, the postage meter 120 is enabled to transmit postal indicia print information and the printer 160 is enabled to print a valid postal indicia.

Figure 2:
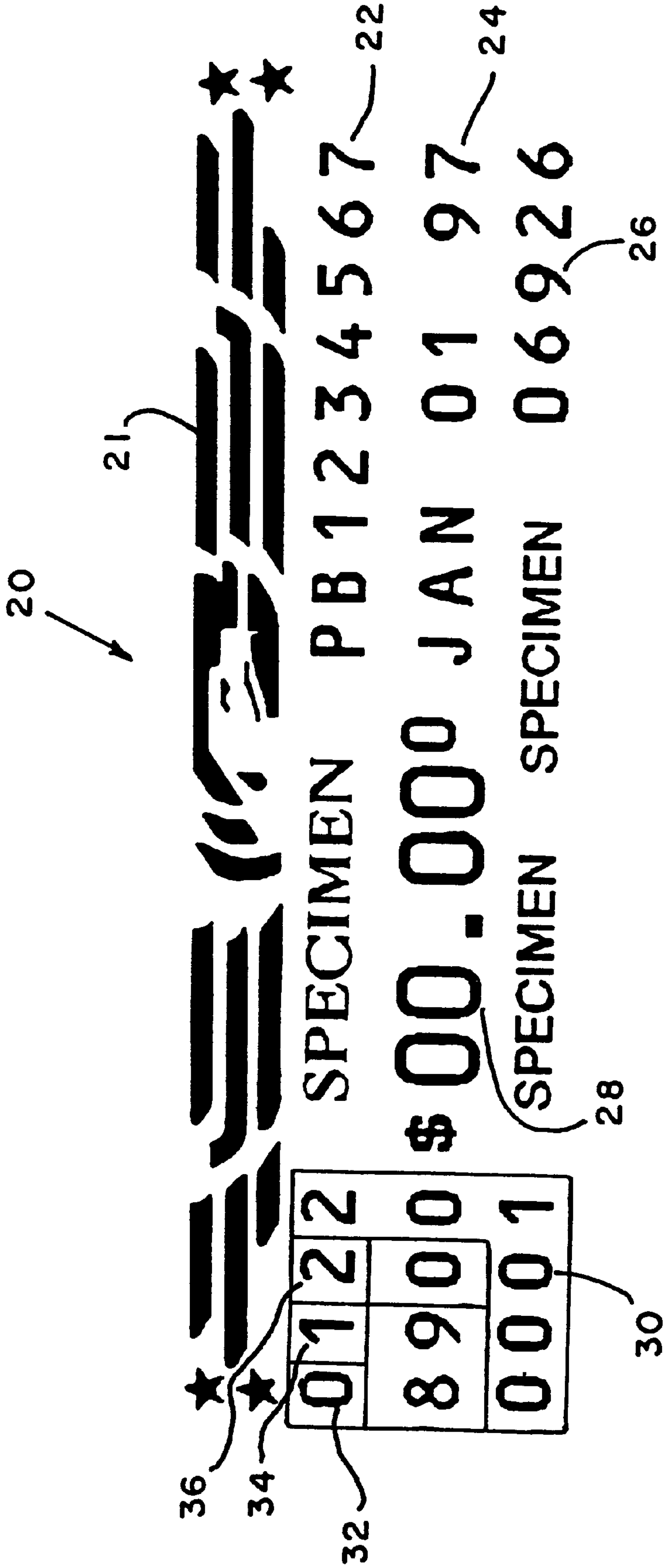
FIG. 2 is an example of a postal indicia printed by the postage printing system of the present invention.

Referring to FIG. 2, an example of a postal indicia 20 is shown. The postal indicia 20 includes both fixed data that does not change from postal indicia to postal indicia and variable data that may change from postal indicia to postal indicia. The fixed data includes a graphic design 21 (an eagle with stars), a meter serial number 22 uniquely identifying the postage meter 120 and a licensing post office ID (zip code) 26. The variable data includes a date 24 indicating when the postage was dispensed, a postal value 28 indicating an amount of postage, a piece count 30, a postage meter manufacturer ID 32, a postage meter manufacturer token 34 and a postal authority token 36. Using the data contained within the postal indicia 20, the postal authority can verify the authenticity of the postal indicia 20 using conventional techniques.

Referring to FIGS. 1 and 2, in the preferred embodiment, the postal indicia 20 is printed by the dot matrix print mechanism 166. As such, the postal indicia 20 is comprised of six hundred (600) columns and two hundred fifty-six (256) rows. The print mechanism 166 prints the postal indicia 20 by successively printing column after column as the print mechanism 166 and the mailpiece (not shown) move relative to each other. The postage meter 120 supplies print data to the printer 160 in sixty-four (64) bit blocks. Thus, each column requires four (4) blocks of print data resulting in the postal indicia 20 requiring two thousand four hundred (2400) blocks of print data.

Figure 3A:
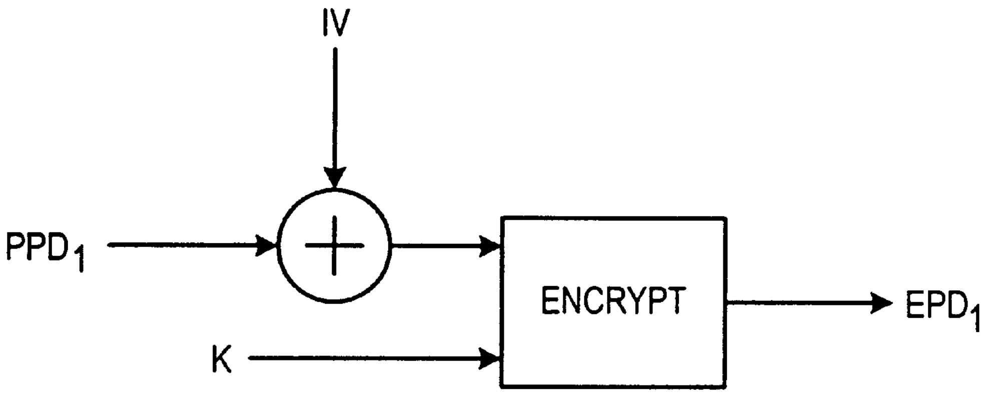
FIGS. 3A and 3B together portray a diagrammatic representation of a cypher block chaining encryption algorithm used to secure the print data sent from the postage meter to the printer.
Figure 3B:
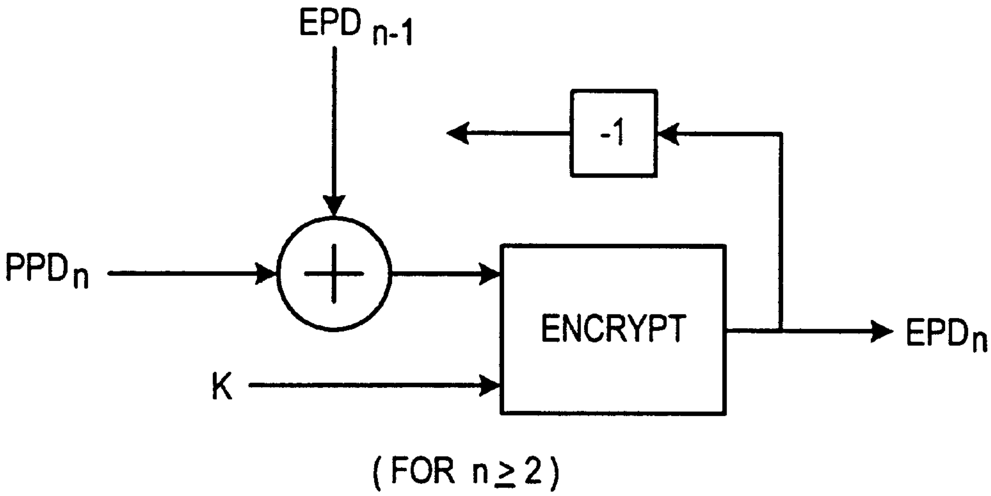

In accordance with the present invention, the print data is generated in conventional fashion by the postage meter 120 and encrypted before being transmitted to the printer 160 where the print data is decrypted prior to use by the print mechanism 166. Referring to FIGS. 3A and 3B in view of the structure of FIGS. 1 and 2, a cypher block chaining (CBC) encryption algorithm used to secure the print data is shown. Generally, in the CBC encryption algorithm, each block of print data is exclusive ORed with a previous block of print data before being encrypted. FIG. 3A shows the beginning of the encryption process for the postal indicia 20. A first block of plain print data $PPD_1$ is exclusive ORed with an initialization vector IV. The output of this operation is then encrypted, using a suitable encryption algorithm, such as the data encryption standard (DES), and a key K, to yield a first block of encrypted print data $EPD_1$. FIG. 3B shows the encryption process for the remainder of the blocks of print data. Each block of plain print data $PPD_n$ is exclusive ORed with the previous block of encrypted print $EPD_{n-1}$. Then, the output of this operation is encrypted as discussed above using the key K to yield a block of encrypted print data $EPD_n$. This process continues until all the blocks of print data in the postal indicia 20 have been encrypted.

To ensure that two (2) identical postal indicias 20, or identical portions of different postal indicias 20, do not yield the same encrypted data result, it is important that the initialization vector IV change from postal indicia 20 to postal indicia 20. In this manner, identical blocks of print data from different postal indicias 20 will not encrypt to the same blocks of encrypted print data. Within the postage meter 120, it is convenient to use the piece count 30, the ascending register, a random number generator or some other suitable number. So long as the initialization vector IV changes from use to use (is not the same for successive postal indicias), any number will serve adequately.

As discussed above, the printer 160 decrypts the blocks of encrypted print data $EPD_n$ so as to retrieve the corresponding blocks of plain print data $PPD_n$ for use by the print mechanism 166. Those skilled in the art will recognize that the printer 160 performs the inverse functions of those described in FIGS. 3A and 3B using the initialization vector IV which has also been transmitted to the printer 160 by the postage meter 120. Therefore, no further description of the decryption process is necessary.

As an additional measure, each block of encrypted print data $EPD_n$ is transmitted with a corresponding check sum $CS_n$. Using the check sum $CS_n$, a determination can be made whether or not a block of encrypted print data $EPD_n$ changed during transmission. For each block of encrypted print data $EPD_n$ a corresponding check sum $CS_n$ is calculated by the postage meter 120 using any suitable check sum algorithm. Since the check sum $CS_n$ is derived from and thus representative of the block of encrypted print data $EPD_n$, any transmission errors, reception errors or tampering with the encrypted print data $EPD_n$ may be detected by the printer 160. Upon receipt of each block of encrypted print data $EPD_n$, the printer 160 independently calculates the check sum $CS_n$ and compares it with the check sum $CS_n$ that was received. If they are the same, then the transmission of the block of encrypted print data $EPD_n$ from the postage meter 120 to the printer 160 occurred without any changes. On the other hand, if the check sum $CS_n$ that was calculated by the printer 160 does not match that received from the postage meter 120, then the block of encrypted print data $EPD_n$ changed during transmission. It will be appreciated that other checking schemes, such as cyclic redundancy checking or the like, could be employed in place of the check sum.

By validating the transmitted check sum $CS_n$ in this manner, additional security measures may be employed. As described above, two thousand four hundred (2400) blocks of print data are required to print the postal indicia 20. If a predetermined threshold number T, for example six (6), of the corresponding check sums $CS_n$ suffer validation failures (different check sum $CS_n$ calculated by the printer 160 than that received from the postage meter 120), then the printer 160 may register a fault condition as described in copending U.S. patent application Ser. Co./No. 09/032,391, concurrently filed herewith, and entitled POSTAGE PRINTING SYSTEM HAVING SECURE REPORTING OF PRINTER ERRORS, which is incorporated herein by reference.

Validation of the check sums $CS_n$ may also be used to distinguish between "noise" in the communication pathway causing transmission and/or reception errors and tampering. Validation failures caused by "noise" would likely be dispersed randomly and uniformly throughout the postal indicia 20. On the other hand, validation failures due to tampering would likely be confined to specific portions of the postal indicia 20. For example, the majority of the postal indicia 20 is comprised of insignificant data, such as: the graphic design 21 and all the blank area where printing does not occur. The attacker is not interested in tampering with the insignificant data because the postal authority does not use this data to validate the postal indicia 20. On the other hand, the postal indicia 20 includes significant data, such as: meter serial number 22, date 24, postage amount 28, tokens 34 and 36, etc., that are used by the postal authority to validate the postal indicia 20. Thus, the attacker would be interested in tampering with the significant data in an attempt to deceive the postal authority.

A comparison of a rate of validation failures in the check sum $CS_n$ for the significant data $F_{SD}$ (number of validation failures concerning of blocks of significant data divided by total number of blocks of significant data) versus a rate of validation failures in the check sum $CS_n$ for the insignificant data $F_{ID}$ (number of validation failures concerning of blocks of insignificant data divided by total number of blocks of insignificant data) can be used to distinguish between "noise" and tampering. In an environment with only "noise" present, it would be expected that any differences between $F_{SD}$ and $F_{ID}$ would not be statistically relevant. On the other hand, if $F_{SD}$ is disproportionally large compared with $F_{ID}$, then it is likely that tampering has occurred and the printer 160 may take corrective action, such as: registering a fault condition, ceasing further printing, communicating an appropriate message to the postage meter 120 for subsequent uploading to the data center 50 using the techniques described within U.S. patent application Ser. Co./No. 09/032,391 entitled POSTAGE PRINTING SYSTEM HAVING SECURE REPORTING OF PRINTER ERRORS, or other appropriate action. As an illustration, if $F_{SD}$ divided by $F_{ID}$ (so long as is $F_{ID}$ is non-zero) is greater than a predetermined number, for example ten (10), then a determination can be made that $F_{SD}$ is disproportionally large compared with $F_{ID}$. This will provide some tolerance within the system to accommodate for slight variations in validation failure rates. Thus, any technique that establishes that the rate of validation failures for the significant data $F_{SD}$ is statistically meaningful when compared with the rate of validation failures for the insignificant data $F_{ID}$ would serve adequately well.

Thus, besides being used to register fault conditions, the check sum validation rates may be used for more decisive preventive action. For example, if the rate of validation failures for the significant data $F_{SD}$ is statistically meaningful when compared with the rate of validation failures for the insignificant data $F_{ID}$, then the printer controller 162 may disable the printer 160. This may be accomplished by: failing to decrypt the print data properly, not decrypting the print data at all, not supplying data to the print mechanism 166, or the like.

Those skilled in the art will recognize that the check sums may be calculated on either the plain print data or the encrypted print data. The printer can recalculate the check sums accordingly and make the appropriate comparisons.

As a variation on the techniques described above, the print data need not be transmitted in fixed block lengths. Instead, variable block lengths could be employed. In this way, the blocks of print data could be arranged so that each block of print data contained only either insignificant or significant data. In using fixed block lengths, it may occur that a block of print data contains both types of data. Thus, a determination would need to be made as to how to categorize those blocks of print data containing both types of data.

It should now be apparent to those skilled in the art that the present invention provides for additional security of the print data being transmitted from the postage meter to the printer. The present invention achieves this without the need to change the key K for each postal indicia 20 which would lead to increased overhead due to the necessity of keeping the keys used by the postage meter 120 and the printer 160 synchronized. The present invention allows for a constant key K to be employed.

It should be understood that the present invention is applicable to other postage printing systems where the postage meter does not generate all the print data. For example, the fixed data may be stored at the printer while the variable data is generated by the postage meter. In this case, the variable data is transmitted to the printer and then merged with the fixed data at the printer. Thus, those skilled in the art will recognize that the exact amount of data per postal indicia that the postage meter generates and transmits to the printer is not a limiting factor to the practice of the present invention.

Many features of the preferred embodiment represent design choices selected to best exploit the inventive concept as implemented in a postage printing system having a postage meter, base and a printer. However, those skilled in the art will recognize that the concepts of the present invention can be applied to other postage printing system configurations that do not include a base, such as where the postage meter is a stand alone unit in operative communication with a printer. That is, the present invention is applicable to any postage printing system where the postage metering portion is remotely located from the printing portion. In this context, remote may mean adjacent, but not co-located within the same secure structure, or physically spaced apart.

Also, those skilled in the art will recognize that various modifications can be made without departing from the spirit of the present invention. For example, the CBC encryption algorithm and the check sum validation techniques for evidence of tampering may be employed together, as described above, or independently. Therefore, the inventive concept in its broader aspects is not limited to the specific details of the preferred embodiment but is defined by the appended claims and their equivalents.

What is claimed is:

1. A postage printing system, comprising:

a postage meter including a postage meter control system that generates print information necessary to print a postal indicia, the print information including a plurality of print data blocks; and a printer located remotely from the postage meter and including a printer control system and a print mechanism for printing the postal indicia; the printer control system being in operative communication with the postage meter control system for receiving the plurality of print data blocks; and wherein:

the plurality of print data blocks are characterized as either of significant data content or insignificant data content; and the printer control system determines a significant data validation failure rate for the plurality of print data blocks of significant data content, and an insignificant data validation failure rate for the plurality of print data blocks of insignificant data content.

2. The postage printing system of claim 1, wherein:

the print control system compares the significant data validation failure rate to the insignificant data validation failure rate for evidence of tampering.

3. The postage printing system of claim 2, wherein:

the postage meter control system calculates a plurality of check numbers for each of the plurality of print data blocks, respectively, and transmits the plurality of check numbers to the printer control system; and the printer control system uses the plurality of check numbers to determine the significant data validation failure rate and the insignificant data validation failure rate.

4. The postage printing system of claim 3, wherein:

the postage meter control system encrypts the plurality of print data blocks using a cypher block chaining encryption algorithm prior to transmission to the printer control system.

5. The postage printing system of claim 4, wherein:

the printer control system disables the postage printing system if the significant data validation failure rate exceeds the insignificant data validation failure rate by a threshold indicator.

6. A postage printing system, comprising:

a postage meter including a postage meter control system that generates print information necessary to print a postal indicia, the print information including a plurality of print data blocks; and a printer located remotely from the postage meter and including a control system and a print mechanism for printing the postal indicia; the printer control system being in operative communication with the postage meter control system for receiving the plurality of print data blocks; and wherein:

the plurality of print data blocks are characterized as either of significant data content or insignificant data content;

the postage meter control system: (i) encrypts the plurality of print data blocks into a plurality of encrypted print data blocks, respectively, and (ii) calculates a plurality of check numbers for each of the plurality of print data blocks, respectively, and transmitting the plurality of check numbers to the printer control means; and the printer control system: (i) decrypts the plurality of encrypted print data blocks so that the print means may print the postal indicia; (ii) calculates a plurality of check numbers for each of the plurality of print data blocks, respectively, and for each of the plurality of print data blocks determining if a check number received from the postage meter matches a corresponding check number calculated by the printer control means so as to validate the integrity of transmission of each of the plurality of print data blocks from the postage meter to the printer; (iii) determines a significant data validation failure rate for the plurality of print data blocks of significant data content; (iv) determines an insignificant data validation failure rate for the plurality of print data blocks of insignificant data content, and (v) compares the significant data validation failure rate to the insignificant data validation failure rate for evidence of tampering.

7. The postage printing system of claim 6, wherein:

the printer control system disables the postage printing system if the significant data check validation failure rate exceeds the insignificant data check validation failure rate by a threshold indicator.

8. A method of operating a postage printing system including a postage meter and a printer, the printer located remotely from the postage meter and including a print mechanism for printing a postal indicia, the method comprising the step(s) of:

generating, at the postage meter, print information necessary to print the postal indicia, the print information including a plurality of print data blocks;

characterizing the plurality of print data blocks as either of significant data content or insignificant data content; and determining a significant data validation failure rate for the plurality of print data blocks of significant data content, and an insignificant data validation failure rate for the plurality of print data blocks of insignificant data content.

9. The method of claim 8, further comprising the step(s) of:

comparing the significant data validation failure rate to the insignificant data validation failure rate for evidence of tampering.

10. The method of claim 9, further comprising the step(s) of:

calculating, at the postage meter, a plurality of check numbers for each of the plurality of print data blocks, respectively, and transmitting the plurality of check numbers to the printer; and using the plurality of check numbers to determine the significant data validation failure rate and the insignificant data validation failure rate.

11. The method of claim 10, further comprising the step(s) of:

encrypting the plurality of print data blocks at the postage meter using a cypher block chaining encryption algorithm prior to transmission to the printer.

12. The method of claim 11, further comprising the step(s) of:

disabling the postage printing system if the significant data validation failure rate exceeds the insignificant data validation failure rate by a threshold indicator.

13. A method of operating a postage printing system including a postage meter and a printer, the printer located remotely from the postage meter and including a print mechanism for printing a postal indicia, the method comprising the step(s) of:

generating, at the postage meter, print information necessary to print the postal indicia, the print information including a plurality of print data blocks;

characterizing the plurality of print data blocks as either of significant data content or insignificant data content;

encrypting, at the postage meter, the plurality of print data blocks into a plurality of encrypted print data blocks;

calculating, at the postage meter, a plurality of check numbers for each of the plurality of print data blocks, respectively, and transmitting the plurality of check numbers to the printer;

decrypting, at the printer, the plurality of encrypted print data blocks;

calculating, at the printer, a plurality of check numbers for each of the plurality of print data blocks, respectively, and for each of the plurality of print data blocks determining if a check number received from the postage meter matches a corresponding check number calculated by the printer so as to validate the integrity of transmission of each of the plurality of print data blocks from the postage meter to the printer determining a significant data validation failure rate for the plurality of print data blocks of significant data content;

determining an insignificant data validation failure rate for the plurality of print data blocks of insignificant data content; and comparing the significant data validation failure rate to the insignificant data validation failure rate for evidence of tampering.

14. The method of claim 13, further comprising the step(s) of:

disabling the postage printing system if the significant data validation failure rate exceeds the insignificant data validation failure rate by a threshold indicator.

* * * * *